United States Patent [19]

Scardovi et al.

[11] Patent Number: 4,630,072

[45] Date of Patent: Dec. 16, 1986

[54] JET PRINTING APPARATUS

[75] Inventors: Alessandro Scardovi, Ivrea; Adriano Fetta, Castellamonte; Aldo Chiaro, Caluso, all of Italy

[73] Assignee: Ing. C. Olivetti & C., S.p.A., Ivrea, Italy

[21] Appl. No.: 693,161

[22] Filed: Jan. 22, 1985

[30] Foreign Application Priority Data

Jan. 20, 1984 [IT] Italy .............................. 67055 A/84

[51] Int. Cl.⁴ ............................................ G01D 15/18

[52] U.S. Cl. ................................................ 346/140 R

[58] Field of Search ........................................ 346/140

[56] References Cited

U.S. PATENT DOCUMENTS

| | | | |
|---|---|---|---|
| 3,683,212 | 8/1972 | Zoltan | 346/140 X |
| 3,832,579 | 8/1974 | Arndt | 346/140 X |
| 4,233,610 | 11/1980 | Fischbeck | 346/140 |
| 4,415,909 | 11/1983 | Italiano | 346/140 |
| 4,418,354 | 11/1983 | Perduijn | 346/140 |
| 4,485,386 | 11/1984 | Dagna | 346/140 X |
| 4,528,579 | 7/1985 | Brescia | 346/140 |

*Primary Examiner*—Joseph W. Hartary
*Attorney, Agent, or Firm*—Banner, Birch, McKie & Beckett

[57] ABSTRACT

The apparatus is of the type wherein a piezoelectric transducer (19) is selectively operated to produce a pressure wave in the ink in a duct (16, 22), which causes a droplet of ink to be expelled from the nozzle (18). In order to absorb the energy of the pressure wave which is directed towards the ink reservoir (47) the duct comprises a portion (22) of viscoelastic material, which is so dimensioned as to damp the resonance of the duct for frequencies higher than a predetermined cut-off frequency. Frequencies which are lower than the cut-off frequency however are damped by an hour-glass shaped constriction (34) in a tube (33) disposed between the viscoelastic portion (22) of the duct and the reservoir (47). The second portion (22) of the duct comprises a polyamide base material, the modulus of elasticity of which is substantially stable over a wide range of possible operating temperatures. The second portion of the duct may comprise a flexible tube (22) or a double spiral passage (not shown) provided between two substantially square plates.

14 Claims, 13 Drawing Figures

JET PRINTING APPARATUS

BACKGROUND OF THE INVENTION

The present invention relates to a selective ink jet printing apparatus comprising a duct terminated at one end by a nozzle, the duct comprising a first portion of substantially rigid material carrying the nozzle, and arranged to be selectively conditioned by a transducer to generate a pressure wave which causes a droplet of ink to be expelled through the nozzle, and a second portion of viscoelastic material, arranged substantially to absorb the energy of said pressure wave propagating back within the duct.

As is known, a pressure wave in a liquid in a duct gives rise to reflection phenomena both at the end of the duct and in discontinuities in the duct itself. In addition, by virtue of the physical and geometrical characteristics of the duct and the physical characteristics of the liquid, each duct portion behaves like a system which resonates at a predetermined frequency.

In selective ink jet apparatus, since the period of time between one expulsion operation and the next varies within very wide limits, it is not possible entirely to avoid actuation of the jet at the resonant frequencies of the various duct portions.

U.S. Pat. No. 3,832,579 proposes two ink jet apparatuses in which at least a part of the energy of the pressure wave propagating towards the ink reservoir is absorbed before reaching the reservoir. In one of those two apparatuses, the energy absorption effect is achieved by means of an acoustic resistance which is formed for example by a bunch of glass fibres disposed in an intermediate portion of the duct. In the other apparatus, the intermediate portion of the duct comprises a tube of viscoelastic material, the diameter of which is such as to eliminate reflection phenomena at its connection to the duct portion carrying the nozzle, and the length of which is such as to absorb that part of the energy from the pressure wave.

Another selective ink jet apparatus has also been proposed in European patent application No. 21755, wherein the energy of the wave towards the reservoir is absorbed by a grating or grid which is disposed in the duct in the vicinity of the nozzle to damp oscillation of the meniscus, while a second grating or grid disposed at the opposite end of the duct eliminates reflection of the residual wave.

In the above-mentioned known apparatuses however, no account is taken of either the inherent resonance of the meniscus in the nozzle or the inherent resonance of the duct portion of viscoelastic material, the frequency of which decreases with the length of the duct. Also ignored is the variation in the viscoelastic characteristics of the material of the duct as the ambient temperature varies.

There exists a need for a selective ink jet printing apparatus wherein the energy of a wave of any frequency is substantially absorbed and the resonance phenomena of the individual duct portions are damped.

SUMMARY OF THE INVENTION

Apparatus according to the present invention is of utmost simplicity and operational reliability and is characterised in that the second portion of the duct is connected to a hydraulic resistance for damping the resonance of the duct at the frequencies lower than a cut-off frequency defined by the hydraulic resistance, and in that the second portion is so dimensioned as to damp the resonance of the duct for frequencies which are higher than the predetermined cut-off frequency.

In accordance with another feature of the invention, said resistance comprises a third duct portion of rigid material having an hour-glass shaped constriction.

In accordance with a further feature of the invention, the second portion of the duct comprises a material whose modulus of elasticity in a temperature range of from 15° C. to 50° C. varies by less than 100% with respect to the minimum value, preferably less than 60%.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
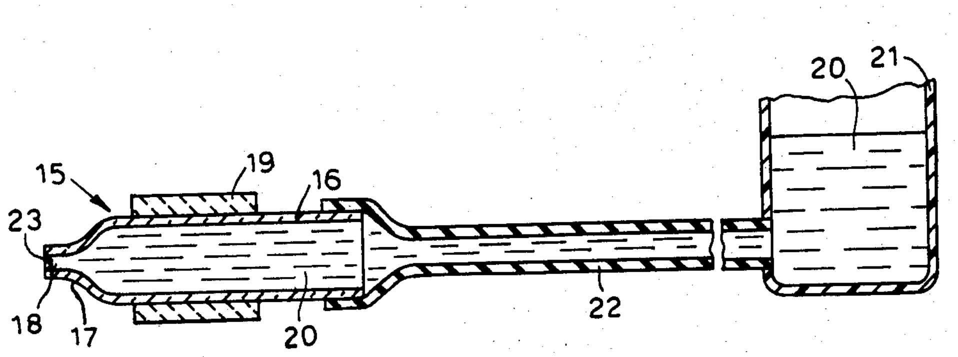
FIG. 1 is a diagrammatic view of a selective ink jet printing apparatus which is known in the state of the art.

Referring to FIG. 1, reference numeral 15 generally denotes a selective ink jet printing element which is known in the art and which comprises a tube 16 of rigid material, for example glass, with an outside diameter of the order of 1 mm. The tube 16 terminates towards the left-hand side in FIG. 1 with a tapered portion 17 and a nozzle 18 whose diameter is between 50 and 100 μm.

A piezoelectric transducer 19 of sleeve-like shape is stuck onto the tube 16 and is selectively excited by an electrical pulse to expel a droplet of ink 20 from the nozzle 18. The tube 16 which hereinafter will be referred to as the piezo-carrier tube, is connected to a reservoir for the ink, as indicated at 21, by way of a flexible tube 22 which will be referred to hereinafter as the rearward tube.

The two tubes 16 and 22 constitute the ink conduit or duct, the ink flowing from the reservoir 21 to the nozzle 18 substantially by a capillary action. In the rest condition, the ink 20 forms a meniscus 23 at the nozzle 18.

As is known, the printing elements of the above-described type print characters by means of a dot matrix, for which purpose the transducer 19 is excited selectively only when a dot is to be printed. Let it be assumed that the character matrix has 25 rows of 25 points, including the columns and rows of dots which constitute the spacing between the characters and the line spacing, and that the apparatus emits droplets of ink at a maximum frequency of 10 kHz. If the printing element 15 is to print a continuous horizontal line, the transducer 19 is excited constantly throughout the line at a frequency of 10 KHz. If one dot for each character is to be printed, the excitation frequency will be 400 Hz and, if one dot is to be printed for each line of 80 characters, the frequency will be 5 Hz. In actual fact, in the printing operation, the transducer is excited at maximum frequency for some periods of time while for other periods of time it is excited at some sub-multiple of that frequency, down to frequencies of the order of about 10 Hz. In addition, the various excitation effects at the various frequencies are added together whereby the tube 16 is subjected to pressure waves of energy content and form which are highly variable and complex.

Those waves are transmitted in the ink 20 in the duct 16, 22 and are damped to a greater or lesser degree for example by the walls of the tube 22. The waves are also reflected at the variations in section of the duct itself, in other words, at the nozzle 18, the junction between the tubes 16 and 22 and the junction between the tube 22 and the reservoir 21, whereby, depending on the excitation frequency, operational problems are created, due to resonance phenomena.

In the hydraulic system shown in FIG. 1, three different resonances may be identified: the resonance of the meniscus 23, the resonance of the tube 16 and the resonance of the rearward tube 22.

Figure 2:
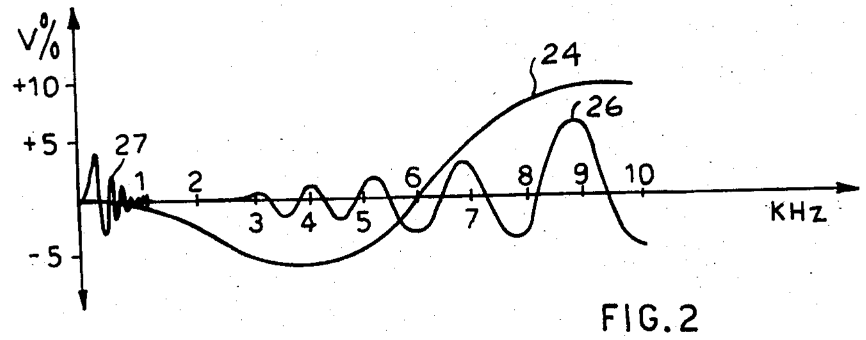
FIG. 2 is a graph showing the variations in the speed of the drops as the frequency varies in the apparatus shown in FIG. 1.

In FIG. 2, the curve 24 indicates the variations in speed of the drops, caused by the resonance of the meniscus 23, in dependence on the frequency of excitation of the transducer 19. On the other hand, the curve 26 indicates the pattern of such variations in the speed of the drop which is caused by the resonance of the tube 16, in the situation where there is a certain reflection of the wave at the connection to the tube 22, while the curve 27 indicates the variation caused by the resonance of the rearward tube 22. This resonance tends to make the meniscus 23 issue from the nozzle, wetting the outside surface of the printing element 15 and resulting in unacceptable malfunctioning of the apparatus. It will be clear from the curve 27 in FIG. 2 that the effect of the resonance of the tube 22 is limited to low frequencies. As will be seen in greater detail hereinafter, the frequency below which there is a variation in the speed of the drops, due to the resonance of the tube 22, depends on the length of the tube 22 itself. The longer the tube, the lower the frequency below which such variations occur. The amplitude of the variations depends however on the viscoelastic characteristics of the material of the tube 22.

On the other hand, the effect of the resonance of the tube 16 (curve 26) increases as the frequency increases and may give rise to anomalies such as multiple satellite drops, off-centre drops etc. Finally, the effect of resonance of the meniscus 23 (curve 24) is manifested at medium frequencies and, with the current sizes of nozzle 18, has a negative maximum at about 4 KHz.

In order to avoid the reflections of the acoustic waves at the connection between the two tubes 16 and 22, known devices have the characteristic impedance Zv of the tube 16 in the connecting section substantially equal to the characteristic impedance Zp of the rearward tube 22. Since the characteristic impedance of a tubular duct or conduit is the impedance that the tube would have if it were of infinite downstream length, it is clear that such an arrangement is never completely satisfactory.

In fact, at the connection between the two tubes, there is a coefficient of reflection $$Cr = \frac{Z'p - Zv}{Z'p + Zv}$$

wherein Z'p is the effective impedance of the tube 22 of finite length. In any case, the pressure wave which originates from the tube 16 and which is not reflected at the connection is propagated in the tube 22 and is partially damped thereby, giving rise however to a fresh problem of reflection at a downstream connection, for example where it meets the reservoir 21, and thus resonance of the rearward tube 22.

It should be noted that the impedance Z of a conduit or duct is dependent on the diameter thereof, the length thereof, the excitation frequency and the modulus of elasticity of the material, which, as is known, varies with temperature. The effective impedances of the two tubes 16 and 22 are two distributed parameters which depend on length. They give rise to multiple composite resonances having a fundamental frequency which is inversely proportional to the length of the respective tube and a series of higher order harmonics of smaller and smaller amplitude.

Figure 3:
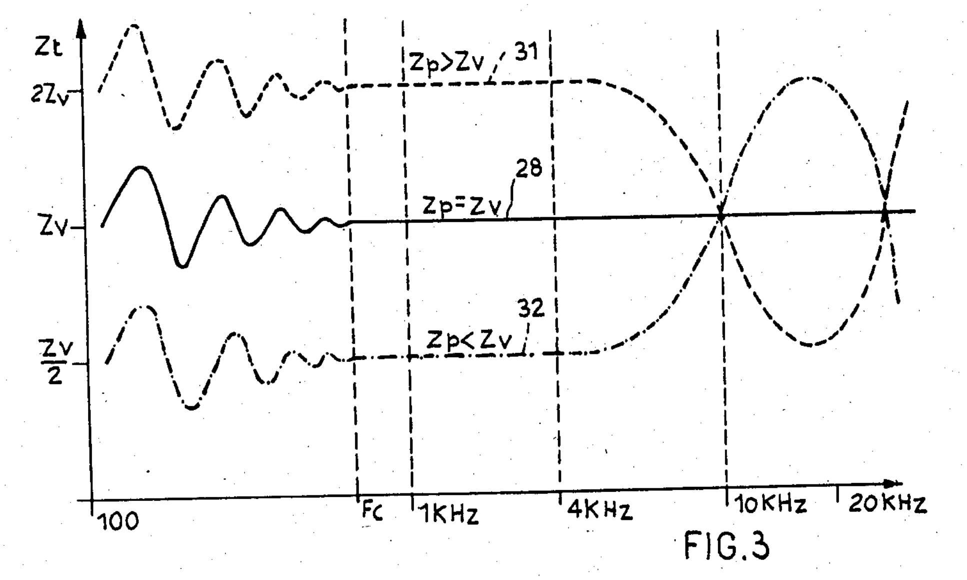
FIG. 3 is a graph showing the impedances of the duct at the various frequencies.

FIG. 3 indicates the total impedance Zt in dependence on frequency. In the case of a conduit or duct which is adapted on the basis of the above-discussed criterion, the value of Zt=Zp=Zv is given by the continuous line curve 28. That indicates a region for frequencies which are greater than a predetermined frequency which, for reasons which will be apparent hereinafter, will be referred to as the cut-off frequency Fc, at which the total impedance Zt is maintained substantially constant.

However, for frequencies which are lower than the cut-off frequency Fc, in the duct shown in FIG. 1, Zt does not remain constant whereby, at such frequencies, a duct, even if adapted and dimensioned as indicated above, remains affected by the resonances due to the rearward tube 22.

FIG. 3 also shows two curves 31 and 32 which are represented respectively by a broken line and by a chain dotted line, which show the variation in the total impedance Zt when the conduit is not adapted as described. In particular, the curve 31 relates to the situation in which Zp=2Zv while the curve 32 relates to the situation in which Zp=(Zv/2). It will be clear from those curves that, in the region relating to the frequencies which are lower than the above-mentioned cut-off frequency Fc, the total impedance Zt oscillates as in the case of the curve 28. In a region between the above-mentioned frequency Fc and the resonance frequency of the meniscus, that is to say, at about 4 KHz, Zt remains constant while at higher frequencies, there are again substantial oscillations in the value of Zt.

The three curves 28, 31 and 32 are shown in diagrammatic form in order better to reveal the phenomena involved. It will be clear in any case that, for the more common frequencies between 1 KHz and 4 KHz, a constant value of Zt is obtained, whatever the relation between Zp and Zv, whereby it is relatively easy to avoid the phenomena of resonance of the meniscus, even if the effective impedance Z'p is different from Zp and Zv. For frequencies higher than 4 KHz resonance of the tube 16 may be avoided only if Z'p=Zv, while for low frequencies, resonance of the tube 22 may be avoided by enormously elongating the tube 22 itself.

Figure 6:
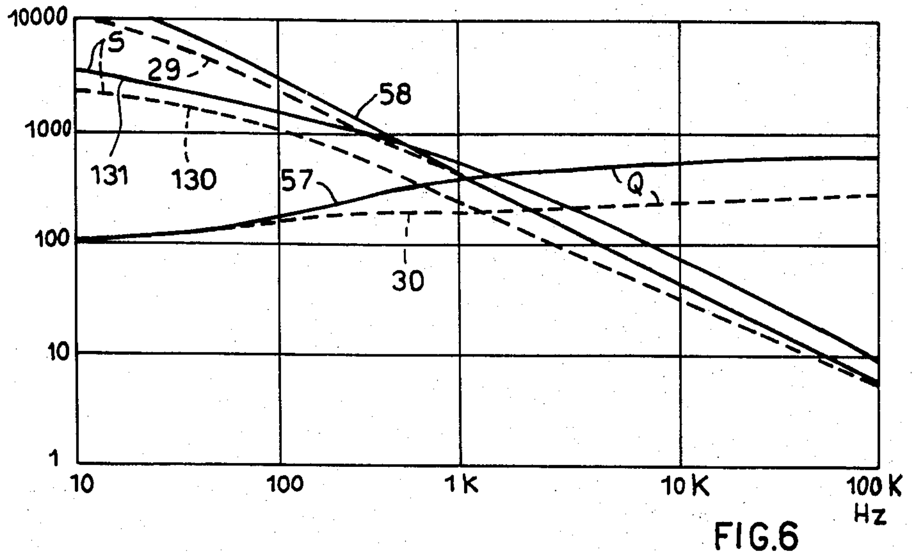

In FIG. 6, a broken line curve 29 shows the relative wavelength in mm, for each frequency. Since the length of tube open on both sides is equal to half the wavelength of its fundamental resonance frequency, the length of the tube 22 which is closed by the ink reservoir 21, in dependence on the frequency of such fundamental resonance, is given by a quarter of the value given by the curve 29. Therefore this curve indicates the main resonant frequency of the tube 22 as a function of its length. That curve relates to a typical polyvinyl viscoelastic material at a temperature of 25° C., for example the PVC which is commonly known by the name TYGON.

In addition, the measurements taken show that the viscoelastic characteristics of the material are effective for damping the resonance of the meniscus 23 and the glass tube 16 but are ineffective in regard to damping the resonance of the tube 22, whereby that damping action is virtually independent of the length of the tube 22. Those observations are set out in FIG. 6, in regard to a broken line curve 30 which indicates the variation in the resonance coefficient Q expressed as a percentage, of a tube of the above-mentioned PVC material in dependence on its fundamental resonance frequency. The above-mentioned coefficient represents the ratio at the point of maximum resonance between the outlet pressure and the inlet pressure of a tube which is closed at one end and open at the other end and varies in regard to the curve 30 from 100% to beyond 300%. Another curve 130 which is also shown as a broken line indicates the weaking distance of the above-mentioned tube at the various frequencies, that is to say, the length S required for the tube for weaking the corresponding frequency of $e^{-1}$ times, i.e. about 2,7 times.

It will be apparent that the value of S increases substantially when going from high frequencies to low frequencies.

The above-indicated observations imply that, by increasing the length of the tube 22, it is possible only to produce a shift in the resonances in lower ranges of frequency, which normally occur less often. It is clear from the curves 29, 30 and 130 therefore that while, for eliminating resonances at frequencies which are higher than a cut-off frequency, for example of 1 KHz, it is sufficient for the length of the tube 22 to be of the order of 50 cm, to eliminate resonance at lower frequencies, for example to a value of 10 Hz, it is necessary for the length of the tube 22 to be several meters.

In the embodiment of the invention, adaptation in regard to the discontinuities in the duct are adapted to make the total effective impedance Zt of the duct at a downstream position, as viewed from the discontinuity section, equal to the characteristic impedance of the conduit at the upstream position. In the case of the junction between the tube 16 and the tube 22, Zv=Z'p, whereby the coefficient of reflection is zero.

In particular, to eliminate resonance of the meniscus 23, a critical resistance of the meniscus 23

$$Rm = 2\sqrt{\frac{L}{C}}$$

must be overcome where C is the compliance of the meniscus and L is the inertance of the nozzle 18. Compliance is used to denote the hydraulic analogue of electrical capacitance, inertance is used to denote the hydraulic analogue of electrical inductance. The duct between the nozzle 18 and the reservoir 21 must be so dimensioned that the total effective impedance Zt seen from the nozzle 18 at the resonance frequency of the meniscus 23 must be equal to said critical damping resistance, that is to say, the arrangement must have Zt=Rm. In turn, the dimensioning of the two tubes 16 and 22 must be such as to give Z'p=Zv wherein Z'p is the effective impedance seen from the connecting section between the two tubes, thus including impedances and resistances downstream of the tube 22.

Figure 4:
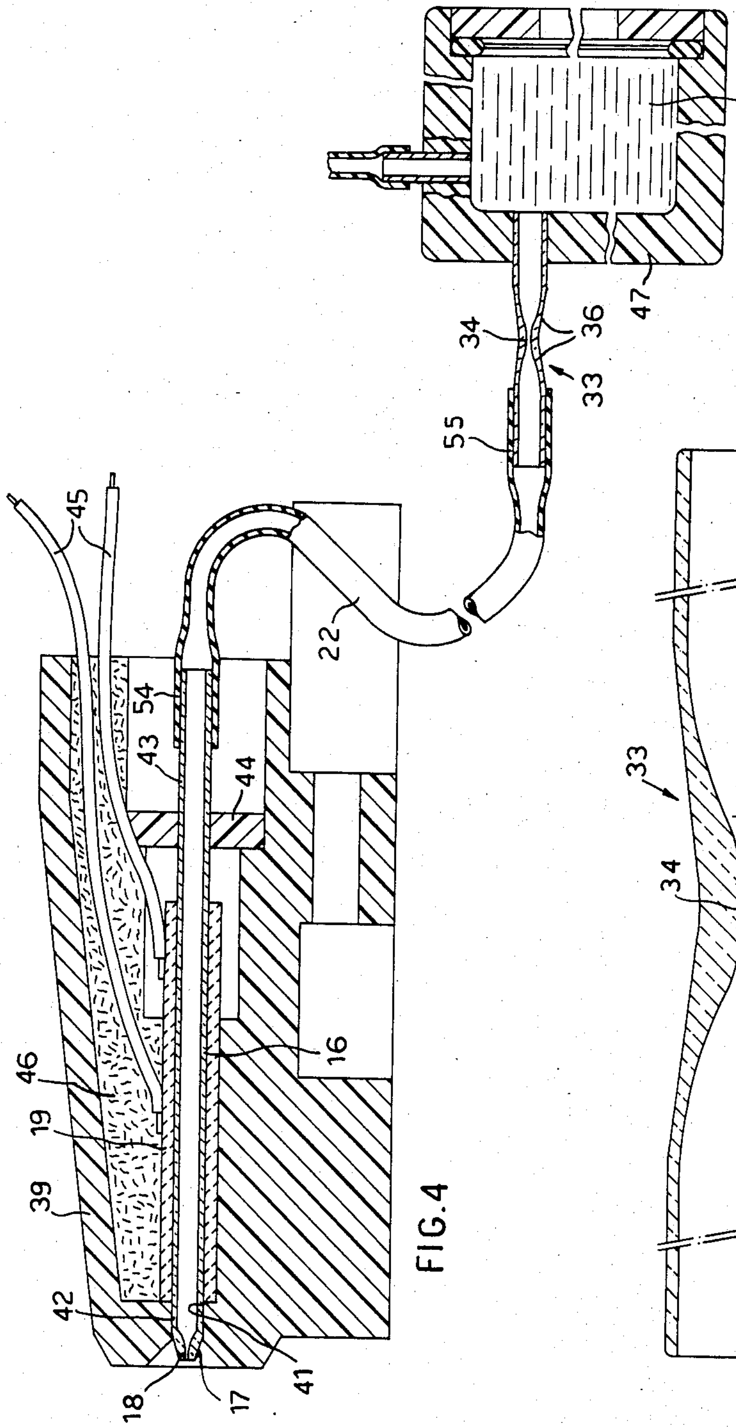
FIG. 4 is a diagrammatic view of an embodiment of a printing apparatus according to the invention.
Figure 5:
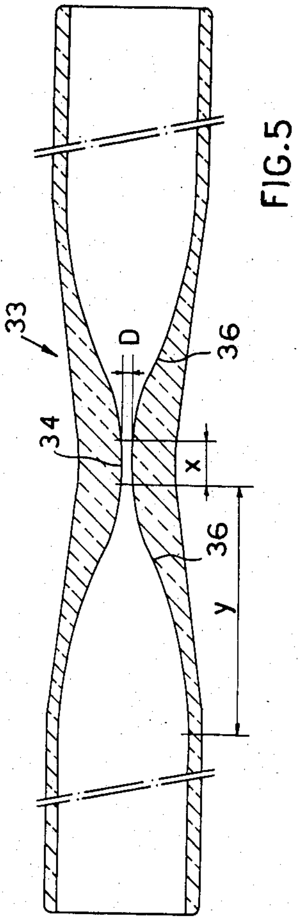
FIG. 5 is a view on an enlarged scale of a detail of the apparatus shown in FIG. 4, FIGS. 6, 7, 8 and 9 are four graphs showing the characteristics of viscoelastic materials.

In the embodiment of FIG. 4, this condition is achieved by positioning, between the tube 22 and the reservoir 20, a hydraulic resistance Rc for damping the resonance of the duct 16, 22 at the frequencies which are lower than the cut-off frequency. In particular, that resistance is a concentrated resistance and must be adapted to the tube 22, that is to say, Rc must be equal to Zp. It is formed by a third duct portion or tube 33 of rigid material, for example glass, having a constriction or hole 34 and two tapering portions 36, which form an hour-glass shaped portion (see FIG. 5). The constriction 34 dissipates the hydraulic energy exclusively by the viscous effect of the liquid. The value of the resistance $$Rc = \frac{8\rho\nu X}{\pi r^4}$$

where $\rho$ and $\nu$ are the density and viscosity of the ink, whereas X and r are the length and the radius of the hole 34. Therefore Rc depends on the diameter of the hole as indicated at D (see FIG. 5) and its length X. It has been found that each hole has a limit frequency beyond which it no longer behaves as a pure resistance but begins to manifest an inertance. That limit frequency constitutes the cut-off frequency of the hole $$Fc = \frac{8\nu}{2\pi\rho^2},$$

which is substantially independent of the length of the hole 34 but is inversely proportional to the diameter D of the duct.

It is therefore sufficient for the hole 34 to be of such a size as to have a cut-off frequency Fc of the hole 34 that is substantially equal to the predetermined cut-off frequency Fc defined for the duct 16, 22 (see FIG. 4) as the frequency below which resonance of the duct 16, 22 occurs.

In particular, the tube 33 is produced by the same method of manufacture as the tube 16, for example in the fashion described in the present applicants' European patent application No. 116018, whereby the external diameter of the tube 33 will be substantially equal to that of the tube 16. The diameter of the hole 34 (see FIG. 5) may be between 20 and 100 $\mu$m, to which there corresponds a frequency Fc comprised between 400 Hz and 2 KHz. From the above formula of the resistance Rc, it is found that its length X is between 2 and 10 times the diameter D. The length Y of each tapering portion 36 of the tube 33 is similar to the part 17 of the tube 16 and therefore is between 25 and 100 times the diameter of the hole 34.

Figure 7:
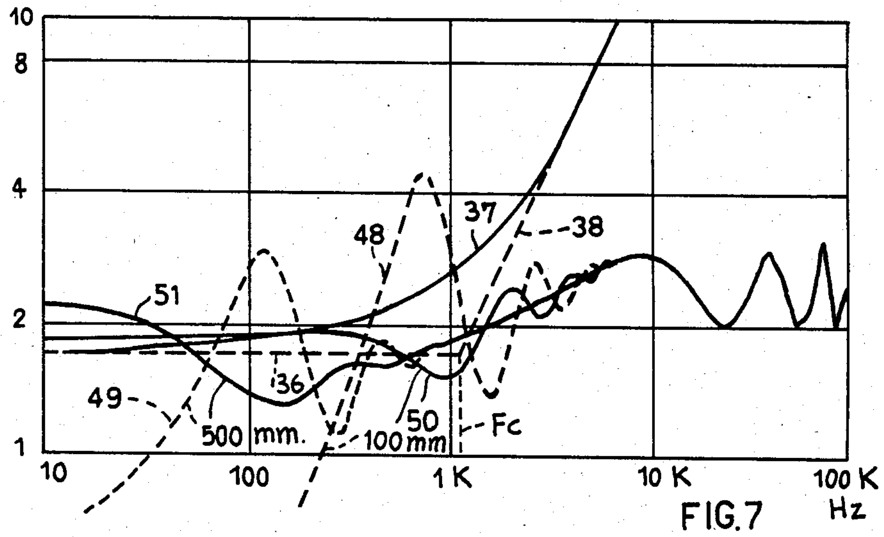

In FIG. 7, the broken line curve 37 represents the values of the resistance Rc, which are measured for the tube 33 in FIG. 4, wherein D=40 μm and X=200 μm, while the two straight solid lines 38 indicate an ideal simplification in respect of the curve 37, the intersection thereof representing the cut-off frequency Fc. Tests carried out show that, by making the duct 16, 22 of dimensions at least such that Rc=Zp, the hour-glass tube 33 eliminates any resonance below the cut-off frequency Fc and that the possible connection of the tube 33 to the reservoir 21, whether directly or by way of other conduits or filters, has no influence on the resonance of the tube 22.

It will be clear therefore that, by so dimensioning the tube 22 as to damp the resonance phenomena of the duct 16, 22 and for frequencies higher than the predetermined cut-off frequency Fc of the hole 34 and by inserting, between the tube 22 and the reservoir, a concentrated hydraulic resistance, for example the hour-glass 33, for damping the resonance of the duct 16, 22 for the frequencies lower than the cut-off frequency, any resonance of the duct itself is eliminated.

In FIG. 4, the tube 16, which is coupled to the transducer 19, is mounted on a plastics structure 39 which is movable transversely with respect to the paper and which constitutes the print head. The structure 39 is provided with a hole 41 into which is fitted the forward part 42 of the tube 16, which is free from the transducer 19, while the rearward part 43 of the tube 16 is supported by a ring 44. The tube 16 with the transducer 19 and the associated electrical connections 45 is finally fixed to the structure 39 by embedding same in a resin 46 which fills the cavities in the structure 39. The tube 33 is connected to an ink container 47 which can be considered as equivalent to the reservoir 21 in FIG. 1.

In FIG. 7, the broken line curves 48 and 49 indicate, in dependence on frequency, the impedance of the duct 16, 22 with a tube 22 of Tygon, of a length of 100 mm and 500 mm respectively, being connected to the tube 16, but without the hour-glass tube 33. Since, from the curves 48 and 49 it appears that the variation of the impedance is substantially neglectable for frequencies higher than the one corresponding to the second wave, for the curve 49 corresponding to a tube 22 of 500 mm a cut-off frequency of about 1 KHz can be assumed, whereas for the curve 48 corresponding to a tube 22 of 100 mm the cut-off frequency is of about 5 KHz. An hour-glass tube 33 to be fitted to the tube 22 has been dimensioned as to have the Fc of about 1 KHz as shown in FIG. 7. The solid line curves 50 and 51 indicate the total impedance of the duct 16, 22 with the tubes 22 related to the curves 48 and 49, to which the hour-glass tube 33 has been fitted. It will be clear that the curves 48 and 49 have a resonance peak at about 1 kHz and about 100 Hz respectively, while such peak virtually disappears in the curves 50 and 51, whereby the main resonances of the duct 16, 22 are suppressed by the tube 33. However, the curve 50 has a trough, at about 1 kHz, which is a commonly occurring frequency, while in regard to the curve 51, the trough is at about 120 Hz, whereby with a tube 22 of 500 mm the trough of the curve 51 occurs at a very low frequency and produces no significant trouble in the operation.

It will be clear from the curves 31 and 32 in FIG. 3 that if Zp=Zv, the resonance of the tube 16 suddenly becomes harmful in regard to frequencies which are higher than the resonance frequency of the meniscus. Since Zp depends on the modulus of elasticity of the tube 22, it is essential that the viscoelastic material of the tube 22 has a modulus of elasticity of maximum stability upon variations in frequency and above all variations in ambient temperature.

Figure 8:
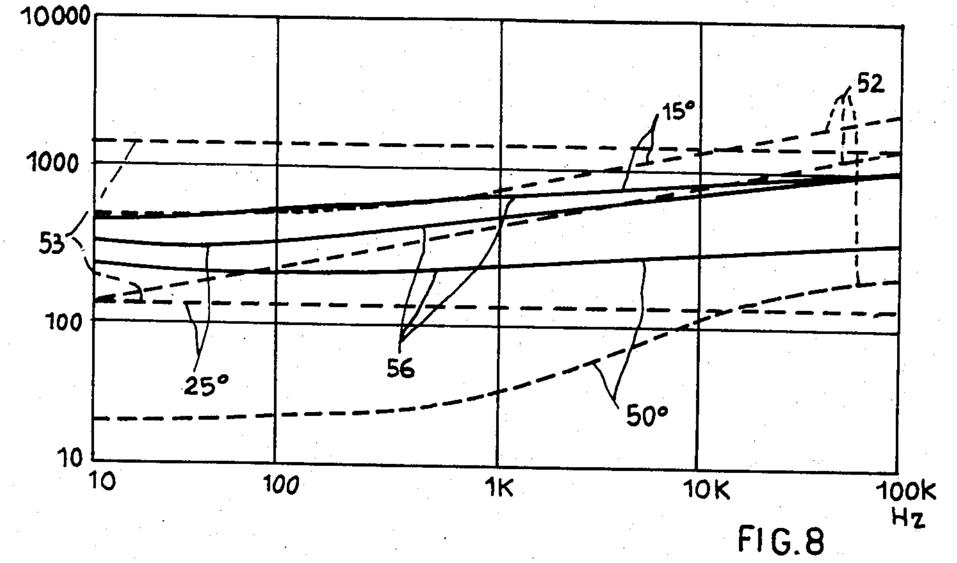

FIG. 8 shows in broken lines three curves 52 relating to the variation in the modulus of elasticity E in dependence on frequency of a polyvinyl material or PVC which is commercially known by the name Tygon. The three curves 52 refer to three characteristic temperatures: 15°, 25° and 50° C. which is a typical range of ambient temperatures in which a printing apparatus may be operated. It will be seen from those curves that the modulus of elasticity varies little on going from 15° C. to 25° C. In particular, FIG. 8 shows, between two broken lines 53, the area which is involved in the variation in the modulus of such material at a temperature of 25° C.

The modulus of elasticity however drops rapidly on going towards 50° C. In addition, at that temperature, the variation in the modulus of elasticity between 10 Hz and 10 KHz increases by more than 300% of the minimum value.

In accordance with a feature of the invention, the rearward tube 22 is made of a polyamide material whose modulus of elasticity varies by less than 100% with respect to the minimum value on going from a temperature of 15° C. to a temperature of 50° C.

The material preferably comprises the polyamide which is commercially known by the name Nylon or the thermoplastic elastomer, which is commercially known by the name Vestamid. The modulus of elasticity of both of these materials is substantially stable with frequency and varies by less than 100% on going from a temperature of 15° C. to 50° C. In FIG. 8, the three continuous line curves 56 are similar to the curves 52, but relate to Nylon. It will be clearly seen that the modulus of elasticity varies only within the limits of the broken-line area indicated at 53 in FIG. 8.

Figure 9:
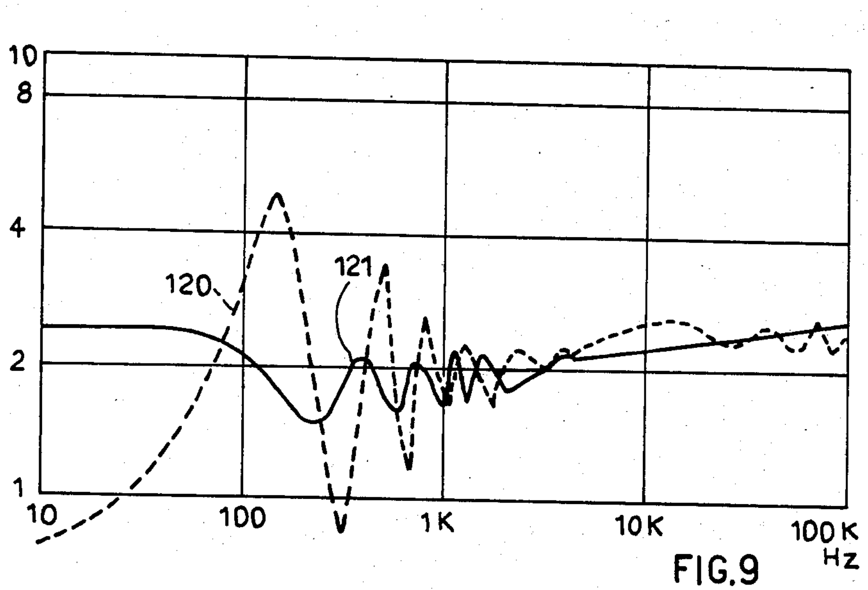

In FIG. 9, the broken line curve 120 indicates, in dependence on frequency, the impedance of a Vestamid tube 22 which is 500 mm in length, connected to the tube 16 but without an hour-glass tube member, while the continuous line curve 121 indicates the impedance of the same tube provided with an hour-glass tube member 33. Those curves confirm the effect of the hour-glass tube member 33 as seen in regard to Tygon, and show that the anomalies between 400 Hz and 4 kHz are eliminated.

FIG. 6 reproduces the curve 57 which is similar to the curve 30 but in relation to Nylon. It is deduced therefrom that the resonance coefficient Q of Nylon is slightly higher than that of Tygon. Consequently, the length of the Nylon tube 22, in dependence on the resonance frequency, represented by a quarter of the wavelength given by the continuous line 58, is slightly greater than that of the Tygon tube. Finally, the continuous line curve 131 shows the weaking distance of Nylon. However, the variation in the weaking distance with Nylon upon variations in frequency is less than when using Tygon, represented by the curve 130. Consequently, the difference in the length of the tube 22 which is required for the low resonances frequencies is reduced to a minimum for a frequency of around 100 Hz.

In conclusion, it can be seen from the curve 57 that, with a cut-off frequency Fc of about 1 KHz, the length of the Nylon tube 22 must be about 50 cm. The internal diameter of the tube 22 may be between that of the tubes 16 and 33 (see FIG. 4) and double the diameter D of the hole 34. Advantageously, the internal diameter of the tube 22 may be between 50% and 80% of the internal diameter of the tube 16, whereby the ends 54 and 55 thereof (see FIG. 4) may be forced onto the tubes 16 and 33, by expanding them slightly.

Figure 10:
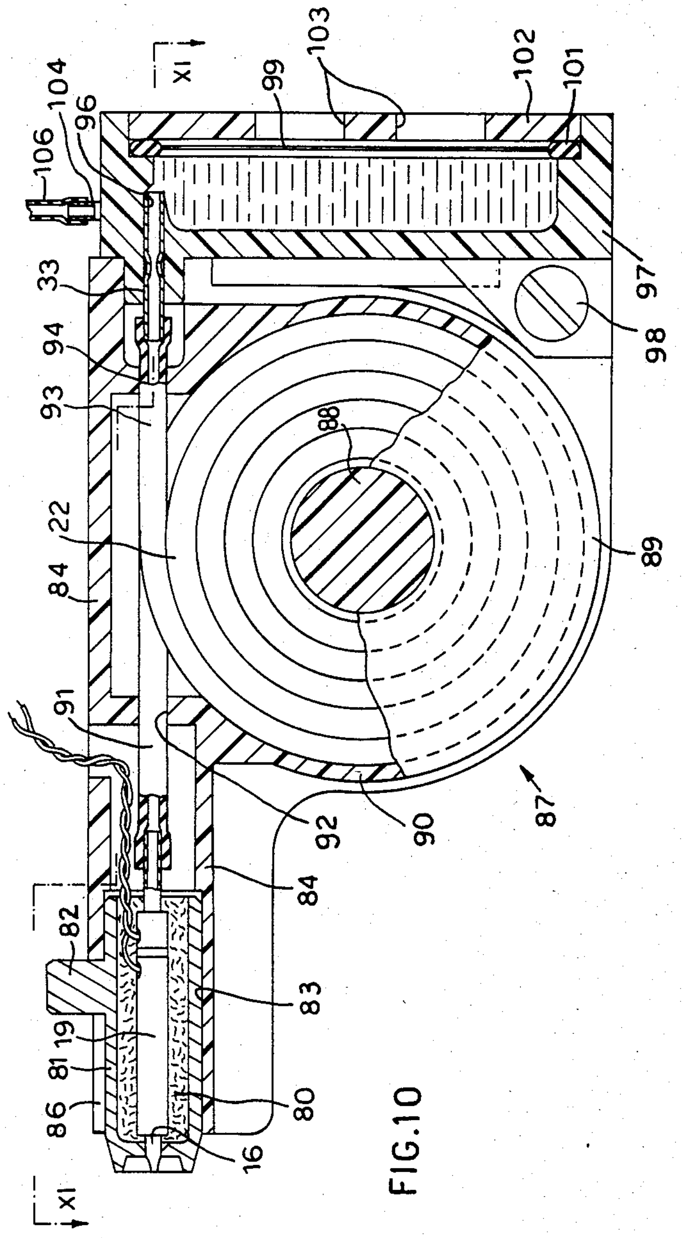
FIG. 10 is a partly sectional side view of another embodiment of the printing apparatus according to the invention
Figure 11:
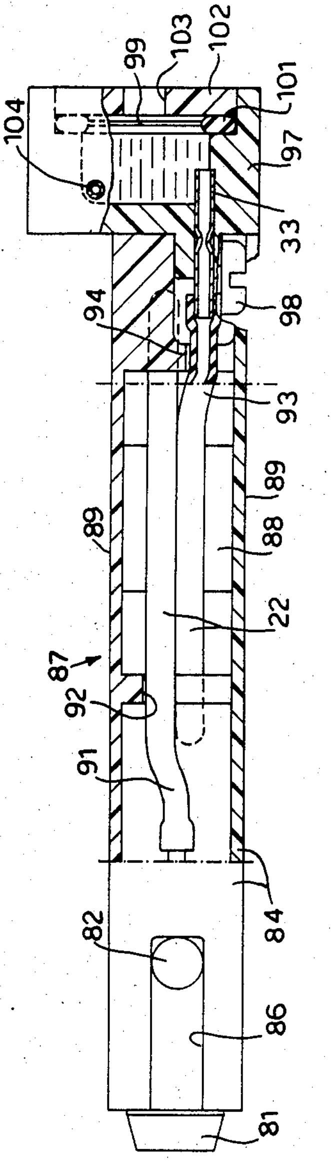
FIG. 11 is a view in section taken along line XI—XI in FIG. 10, showing part of the arrangement illustrated therein.

In accordance with another embodiment of the print head according to the invention, the piezo-carrier tube 16 (see FIG. 10) and the piezoelectric sleeve 19 are enclosed in a cylinder 80 of plastics material which fills a sleeve 81 and through which the forward and rearward ends of the tube 16 project. The sleeve 81 has a cylindrical projection 82 with its axis perpendicular to the axis of the tube 16, by means of which it can be manually fitted into a seat 83 in the body 84 of the head. The head is mounted on a transversely movable carriage (not shown in the drawings). The seat 83 has an upper axial opening 86 (see FIG. 11) through which the projection 82 passes.

The body 84 further comprises a coil structure 87 having a cylindrical core or centre portion 88, a pair of flanges 89 and a partially cylindrical cover 90. The rearward tube 22 is wound around the core portion 88 in such a way as to form two parallel series of turns (see FIG. 11). One end 91 of the tube 22 is housed in a seat 92 and is so disposed as to receive the free rearward end of the tube 16. From the end 91 (see FIG. 10), the tube 22 is wound in a first series of turns towards the centre of the core portion 88 while the second series of turns goes from the core portion 88 towards the periphery and terminates at another end 93 of the tube 22 which is housed in a seat 94 in the body 84, in such a position as to receive the hour-glass tube 33. The latter is fitted into a hole 96 in a substantially parallelepiped-shaped container 97, in such a way as to have a free end which is fitted into the end 93 of the tube 22.

The container 97 is equivalent in the hydraulic circuit to the reservoir 21 shown in FIG. 1 and is fixed for example by means of a screw 98 to the body 84 of the head. The container 97 comprises a dampening means for the ink. For that purpose, it is closed rearwardly by a flexible diaphragm 99 which is sealingly held in position by the edge portion 101 of a cover 102 which is welded to the container 97. The cover 102 is provided with holes 103 so that the diaphragm 99 is always under atmospheric pressure.

The upper wall of the container 97 is provided with a hole 104 (see FIG. 11) into which is engaged a flexible tube 106 (FIG. 10) for connection to the actual ink reservoir (not shown in the drawings) which however is disposed on the fixed frame of the printing apparatus. The purpose of the diaphragm 99 is to absorb the disturbances created by the transverse movement of the head 84 and the pumping effect of the flexing of the connecting tube 106 between the container 97 and the fixed reservoir for the ink.

In accordance with another embodiment of the invention, the rearward tube of the duct for the nozzle comprises a curved passage or duct 108 (see FIG. 12) formed between two plates 109 and 111 of viscoelastic material, which are welded together. In particular, the plates 109 and 111 are Nylon and of substantially square shape. The duct 108 is in the form of a double spiral which, from the centre, unwinds towards two terminal portions 112 and 113 which are disposed at two opposite edges 114 and 116 of the two plates 109 and 111. The two terminal portions 112 and 113 have a step 117 for respectively receiving the tube 16 and the hour-glass tube 33, reducing the discontinuity with the internal section of the duct.

The passage 108 has a cross-sectional area substantially equal to half the cross-sectional area of the tubes 16 and 33. In particular, the passage 108 is square in cross-section, with a side length between 0.3 and 0.8 mm and is formed by a groove or channel 118 (see FIG. 13) in the plate 109, with which there is paired a rib 119 on the plate 111, being of complementary section but of a height such as to produce the required section for the passage 108. Tests carried out show that the damping effect of the passage 108 (see FIG. 12) is identical to that of the flexible tube 22.

Figure 12:
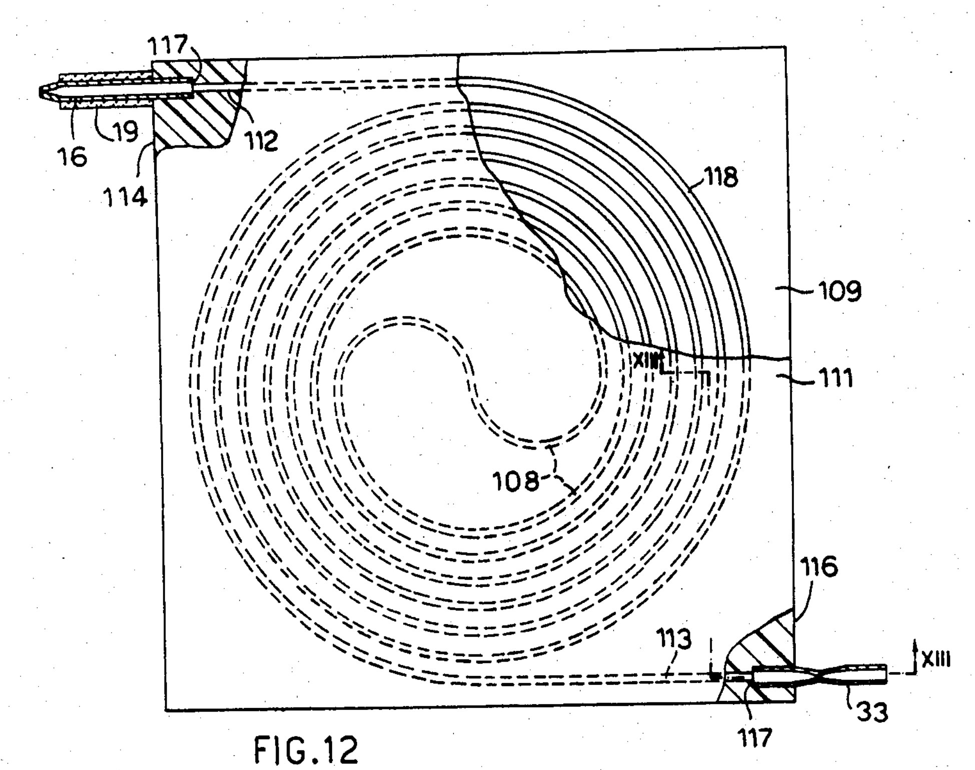
FIG. 12 is a partly sectional side view of another embodiment of the invention.
Figure 13:
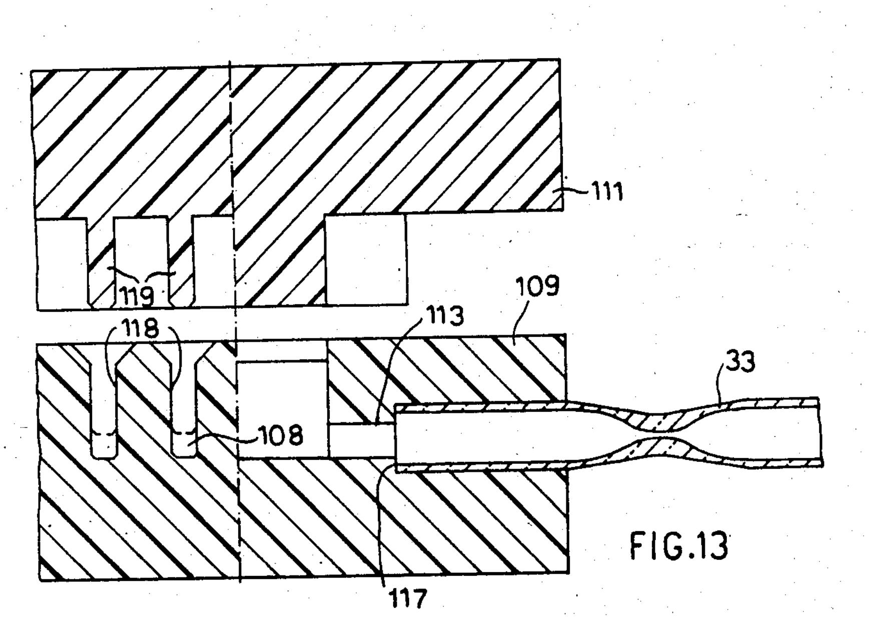
FIG. 13 is an exploded view in section taken along line XIII—XIII in FIG. 12.

The embodiment shown in FIGS. 12 and 13 is very well suited for multi-nozzle print heads, both because of the reduced amount of space occupied by the duct and because any number of plates carrying the channel or groove 118 on one face and the rib 119 on the other face can be stacked together.

It will be apparent that various modifications, improvements and addition of parts may be made in the above-described printing apparatus without departing from the scope of the invention.

In particular, the passage 108 (see FIG. 12) may be of any other configuration different from the double spiral referred to above. In addition, the material for the tube 22 (FIGS. 4 and 10) or the plates 109 and 111 (FIG. 12) may be replaced by other materials having stable moduli of elasticity, besides the abovementioned polyamides which are commercially known as Nylon and Vestamid.

In turn, the tube 33 may comprise any concentrated hydraulic resistance such as a grid, a filter or a plurality of parallel bores.

We claim:

1. A selective ink jet printing apparatus comprising an ink reservoir, a duct terminated at one end by a nozzle, and a piezoelectric transducer selectively operable to generate a pressure pulse causing a droplet of ink to be expelled through said nozzle, said duct comprising a first tube of substantially rigid material carrying said nozzle at one end thereof, said transducer being coupled to said first tube, said pressure pulse generating a pressure wave which propagates toward the other end of said first tube, said duct also comprising a second tube of viscostatic material having a first end section connected to said other end of the first tube and having a diameter so dimensioned as to prevent reflections of the pressure wave coming from the first tube in said first end section, wherein the improvement comprises a third tube of substantially rigid material connected between said ink reservoir and the other end section of said second tube, the connecting section of said third tube having a diameter so dimensioned as to prevent reflections of the pressure wave coming from said second tube, said third tube including an hour-glass shaped passage to form a hydraulic resistance for damping the resonance of said duct at frequencies lower than a cut-off frequency of said resistance defined as the highest frequency to which said third tube operates as a hydraulic resistance and does not manifest an inertance, said second tube having a length so dimensioned as to damp the resonance of the duct for frequencies higher than said cut-off frequency.

2. Apparatus according to claim 1, wherein said hour-glass passage has a minimum diameter of the same order of magnitude as the diameter of said nozzle, and wherein said minimum diameter extends for a portion of substantially constant diameter having a length between 2 and 10 times said minimum diameter.

3. Apparatus according to claim 1, characterised in that the diameter of said passage is such as to define a cut-off frequency of or below 1.2 KHz, the duct having a length of 600 mm or less.

4. Apparatus according to claim 1, characterised in that the second duct portion (22, 108) comprises a polyamide whose modulus of elasticity varies by less than 100% over a temperature range of from 15° to 50° C.

5. Apparatus according to claim 1, characterised in that the tubes of the duct portions (16, 22) and the passage are dimensioned in such a fashion that the effective impedance of the duct, as seen from the terminal section of each tube of the duct towards said reservoir, is equal to the characteristic acoustic impedance of that tube.

6. Apparatus according to claim 5, characterised in that the tubes of the duct and the passage are dimensioned in such a fashion that the effective impedance of the duct as seen from the nozzle is not less than the critical resistance for damping of the oscillation of the ink meniscus in the nozzle.

7. Apparatus according to claim 1, wherein said cut-off frequency is selected as being substantially equal to the minimum frequency at which the total impedance of the duct is maintained substantially constant and equal to the characteristic impedance of said first tube irrespective of the impedance of said second tube.

8. Apparatus according to claim 7, characterised in that said passage (34, 36) of the third tube is located between two tapering connecting portions (36), the maximum diameter of the third tube being of the same order of magnitude as the diameter of the first tube (16) of the duct, and the length of each tapering portion (36) being between 25 and 100 times the minimum diameter (D) of the passage.

9. Apparatus according to claim 8, characterised in that the first and third tubes are glass tubes (16, 33) having diameters in the range 0.5 to 1.5 mm, and in that said second tube (108) is of substantially square cross-section and has a cross-sectional area approximately equal to half that of the glass tubes (16, 33).

10. Apparatus according to claim 8, characterised in that the first tube is a glass tube coupled to a cylindrical piezoelectric transducer, and the second tube is a flexible tube wound in a spiral (87) around a core portion (88) carried by the body (84) of the apparatus, the glass tube (16) being encased in a sleeve member (80) which can be manually inserted into a seat (81) in the body (84) for fitting the glass tube (16) to an end of the flexible tube (22).

11. Apparatus according to claim 10, wherein the body is carried by a carriage which is movable transversely with respect to a print-carrying medium, characterised in that the third tube (33) is carried by a container (97) which is rigidly connected to the body and communicates by means of a further flexible tube (106) with a fixed reservoir, the container (97) being provided with a diaphragm wall (99) subjected to atmospheric pressure, so as to damp the disturbances due to the movement of the carriage and the other flexible tube (106).

12. Apparatus according to claim 8, characterised in that the second tube consists of a conduit (108) formed between two plates (109, 111) of viscoelastic material which are welded together, and has two ends (117) at two separate points of the edge of the plates, in which the first and third tubes (16, 33) are engaged.

13. Apparatus according to claim 12, characterised in that each plate (109, 111) is of substantially square form and the conduit (108) is in the form of a double spiral, the ends (117) being disposed at opposite edges of the plates.

14. Apparatus according to claim 13, characterised in that the conduit is of substantially rectangular section (108) and is formed between a groove (118) on one of the plates (109), and a mating rib (119) of complementary section formed on the other plate (111).

* * * * *